(12) United States Patent
Qu et al.

(10) Patent No.: US 9,239,725 B2
(45) Date of Patent: Jan. 19, 2016

(54) SYSTEM AND METHOD FOR INSTALLING AN OS VIA A NETWORK CARD SUPPORTING PXE

(71) Applicants: Inventec (Pudong) Technology Corporation, Shanghai (CN); INVENTEC CORPORATION, Taipei (TW)

(72) Inventors: Zhongying Qu, Shanghai (CN); Yunlong Yang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 212 days.

(21) Appl. No.: 14/172,531

(22) Filed: Feb. 4, 2014

(65) Prior Publication Data
US 2015/0154033 A1    Jun. 4, 2015

(30) Foreign Application Priority Data

Nov. 29, 2013   (CN) .......................... 2013 1 0628316

(51) Int. Cl.
*G06F 9/00* (2006.01)
*G06F 9/44* (2006.01)
(52) U.S. Cl.
CPC ................................... *G06F 9/4411* (2013.01)
(58) Field of Classification Search
CPC .......... G06F 9/00; G06F 9/4411; G06F 11/00
USPC ....................................................... 713/1, 2
See application file for complete search history.

(56) References Cited

U.S. PATENT DOCUMENTS

| | | | | |
|---|---|---|---|---|
| 6,826,710 B2* | 11/2004 | Merkin | ............... | G06F 11/1417 713/2 |
| 7,353,376 B2* | 4/2008 | Dennis | ................... | G06F 9/4401 710/1 |
| 8,352,721 B1* | 1/2013 | Righi | .................... | G06F 9/4406 713/1 |
| 2003/0200428 A1* | 10/2003 | Chan | ..................... | G06F 9/4416 713/1 |
| 2005/0108515 A1* | 5/2005 | Rangarajan | ........... | G06F 9/4401 713/2 |
| 2005/0216715 A1* | 9/2005 | Matheny | ............... | G06F 9/4416 713/1 |
| 2010/0205598 A1* | 8/2010 | Shao | ....................... | G06F 9/441 717/174 |
| 2012/0259958 A1* | 10/2012 | Tsui | ...................... | G06F 9/4416 709/219 |

\* cited by examiner

*Primary Examiner* — Vincent Tran
(74) *Attorney, Agent, or Firm* — Locke Lord LLP; Tim Tingkang Xia, Esq.

(57) ABSTRACT

The disclosure provides a computer system and a boot method thereof performing steps of: establishing an order of interrupt vectors for an interruption according to an order of BBS tables of hardware peripherals; preserving empty spaces in a first address space of a memory when the hardware peripherals are being initialized; inserting the BBS tables into the empty spaces if the initialized hardware peripherals are first hardware peripherals, or inserting the BBS tables into the first address space except the empty spaces if the initialized hardware peripherals are not the first hardware peripherals; disabling the hardware peripherals except a second hardware peripheral; and rebooting the computer system to activate the remote operating system under a preboot execution environment via one of the first hardware peripherals after the second hardware peripheral boots the preboot execution environment to install a remote operating system into the one of the first hardware peripherals.

18 Claims, 6 Drawing Sheets

Number of drives: 4

| HDD SN | Cylinder | Volume |
|---|---|---|
| 0. | | Master floppy drive |
| 1. | 121 | 953.50 MB\ |
| 2. | 243133 | 1.82 TB |
| 3. | 58369 | 447.13 GB |
| 4. | 30394 | 232.82 GB |

Note: Which disk is preferred to boot?

© SPF FDISK Interface | Version number: 2000-03d | Designer: XXX

FIG.5

SYSTEM AND METHOD FOR INSTALLING AN OS VIA A NETWORK CARD SUPPORTING PXE

CROSS-REFERENCE TO RELATED APPLICATIONS

This non-provisional application claims priority under 35 U.S.C. §119(a) on Patent Application No(s). 201310628316.0 filed in China on Nov. 29, 2013, the entire contents of which are hereby incorporated by reference.

BACKGROUND OF THE INVENTION

1. Technical Field of the Invention

The disclosure relates to a computer system and a boot method thereof, and more particularly to a computer system, supporting a preboot execution environment (PXE), and a boot method thereof.

2. Description of the Related Art

Because the network transmission speed nowadays is getting higher, networks are employed to support the installation of operating systems of computer systems (e.g. desktop computers, notebooks and network computers) and support acquiring data, which is required by computer systems, from remote servers.

Generally, connecting to remote servers through networks is based on a preboot execution environment (PXE) technology. The PXE technology not only can acquire data from a remote server to support the booting of a computer system but also can install an operating system and application programs into the computer system via the remote server. More particularly, in order to carry out the above remote operation, the preboot execution environment is written into a flash memory in a network card (or called as network interface card or network interface controller.

Before the computer system installs its operating system via the network card supporting the preboot execution environment, users have to set the network card supporting the preboot execution environment to be the first boot option (Boot Option #1) having the first priority in a boot menu 20 shown in FIG. 1A. FIG. 1A is a schematic view of a boot menu before a conventional host device is installed with an operating system. The priorities of the first boot option (Boot Option #1), a second boot option (Boot Option #2) and a third boot option (Boot Option #3) are sorted from high to low. In FIG. 1A, the boot menu 20 is in an interface of a basic input output system (BIOS) and shows the model of the network card as "IBA XE Slot 0400 v2196" and a block 30 which provides users with footnotes of function keys.

In order to prevent the computer system from repeating the installation of its operation, after the operating system is installed into the network card supporting the preboot execution environment, the users still have to set a hard disk drive (HDD), which the operating system is installed into, to be a new first boot option in the boot menu 20 so that the computer system can enter into this installed operating system, as shown in FIG. 1B. FIG. 1B is a schematic view of the boot menu after the conventional host device is installed with an operating system.

However, during the installation of the operating system of the conventional computer system, the priority of every boot option in the boot menu 20 has to be edited many times, and when the boot of the network card supporting the preboot execution environment fails, other hardware peripheral (e.g. the HDD indicated by the second boot option or the USB indicated by the third boot option) listed in the boot menu 20 in FIG. 1A will be booted. Moreover, if there are many remote servers and the computer system attempts to install its operating system via the network card supporting the preboot execution environment, information about all of the hardware peripherals in the computer system will not be known accurately in real time because the network card randomly chooses one of the remote servers to install the operating system.

SUMMARY OF THE INVENTION

According to an embodiment, the disclosure provides a boot method of a computer system, the computer system includes a plurality of hardware peripherals, and each of the hardware peripherals provides a basic input output system (BIOS) boot specification table (BBS tables). The boot method includes steps of: establishing an order of interrupt vectors for an interruption according to an order of the BBS tables of the hardware peripherals by the computer system when the computer system performs a power-on self-test of a BIOS; preserving a plurality of empty spaces in a first address space of a memory in the computer system when the hardware peripherals are being initialized, wherein the empty spaces are serial or not serial; inserting the BBS tables into the empty spaces according to a specific order when the initialized hardware peripherals are a plurality of first hardware peripherals, and inserting the BBS tables into the first address space except the empty spaces sequentially when the initialized hardware peripherals are not the first hardware peripherals, to sort the BBS tables according to a relative serial order; enabling a second hardware peripheral of the hardware peripherals and disabling the other hardware peripherals in a setup interface of the BIOS by the BIOS; booting a preboot execution environment via the second hardware peripheral to selectively install a remote operating system into one of the first hardware peripherals; rebooting the computer system after the remote operating system is installed in to the one of the first hardware peripherals; and booting the remote operating system under the preboot execution environment via the first hardware peripheral, which has installed with the remote operating system, when the second hardware peripheral boots the preboot execution environment.

According to an embodiment, the disclosure also provides a computer system which includes: a plurality of hardware peripherals disposed in the computer system and comprising first hardware peripherals and a second hardware peripheral, and each of the hardware peripherals being configured to provide a BBS table; a memory comprising a first address space comprising a plurality of empty spaces; and a BIOS. When the computer system is powered on, the BIOS performs a power-on self-test and establishes an order of interrupt vectors for an interruption according to an order of the BBS tables of the hardware peripherals. When the hardware peripherals is being initialized, there is a plurality of empty spaces preserved in the first address space in the memory, and the empty spaces are serial or not serial. If the initialized hardware peripherals are the first hardware peripherals, the BBS tables of the first hardware peripherals are inserted into the empty spaces according to a specific order to reestablish new interrupt vectors of the hardware peripherals for the BIOS to sort the order of the BBS tables, and if the initialized hardware peripherals are not the first hardware peripherals, the BBS tables of the hardware peripherals are inserted into the first address space except the empty spaces sequentially to sort the BBS tables of the first hardware peripherals according to a relative serial order. Then, the BIOS enables a second hardware peripheral of the hardware peripherals and disables the other hardware peripherals in a setup interface of the BIOS, and after the computer system boots the preboot execution environment via the second hardware peripheral to selectively install a remote operating system into one of the first hardware peripherals in the computer system, the computer system is rebooted. When the rebooted computer system reboots the preboot execution environment via the second hardware peripheral, the rebooted computer system under the preboot execution environment selectively boots the remote operating system via the first hardware peripheral which is installed with the remote operating system, and when the rebooted computer system reboots the preboot execution environment via the second hardware peripheral unsuccessfully, the second hardware peripheral continues rebooting the preboot execution environment to boot the remote operating system until the remote operating system is booted successfully.

As set forth above, the disclosure may preserve many empty spaces in the first address space, and whenever the hardware peripheral having the highest priority is initialized, the BBS table of this hardware peripheral is inserted into the first empty space. Herein, the entry address of the interruption instruction of this hardware peripheral will be invoked so that this hardware peripheral will be first identified in the preboot execution environment. Moreover, in the disclosure, since the hardware peripherals except the hardware peripheral which supports the preboot execution environment are disabled in the boot menu. When the host device installs the remote operating system, only the hardware peripheral supporting the preboot execution environment will be booted. Meanwhile, other hardware peripherals can be identified and booted in the preboot execution environment according to their priority.

BRIEF DESCRIPTION OF THE DRAWINGS

The present disclosure will become more fully understood from the detailed description given herein below for illustration only and thus does not limit the present disclosure, wherein:

FIG. 5 is a schematic view of an interface of a disk operating system of a host device according to one embodiment.

DETAILED DESCRIPTION

Figure 1A:
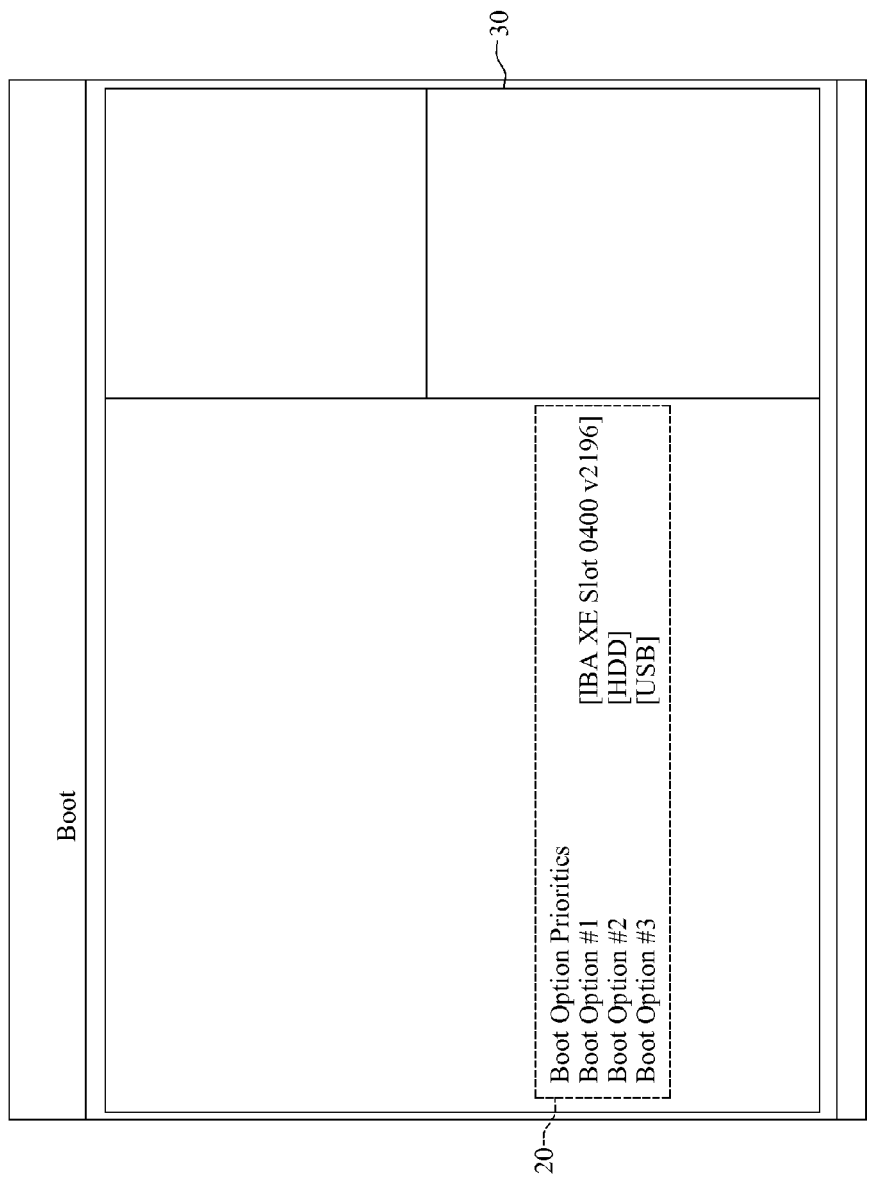
FIG. 1A is a schematic view of a boot menu before a conventional host device is installed with an operating system.
Figure 1B:
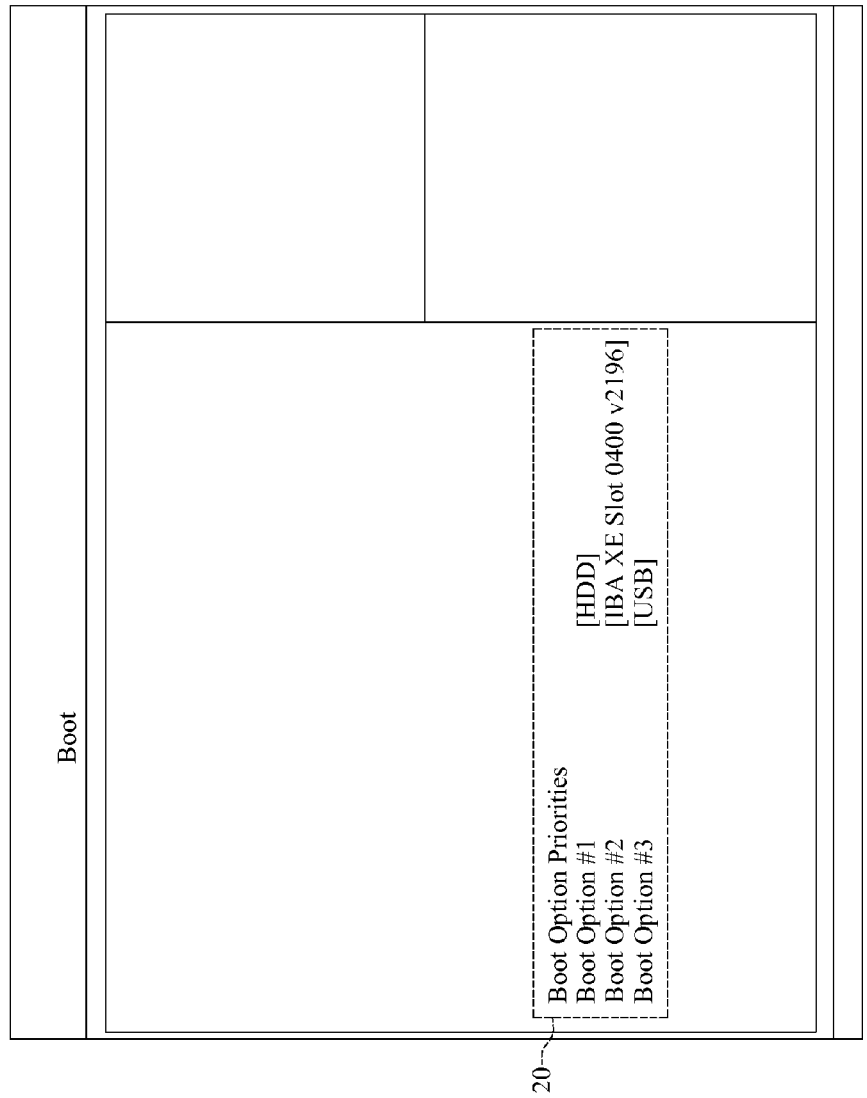
FIG. 1B is a schematic view of the boot menu after the conventional host device is installed with an operating system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
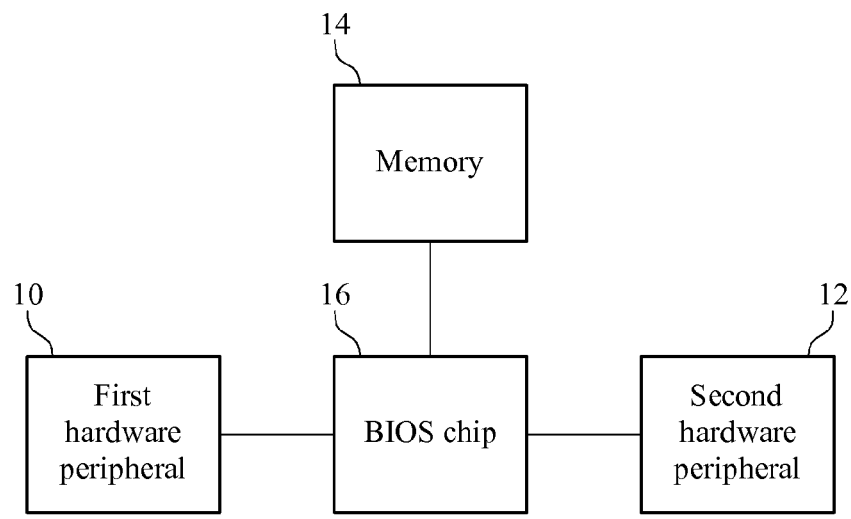
FIG. 2 is block diagram of a computer system according to one embodiment of the disclosure.

FIG. 2 is block diagram of a computer system according to one embodiment of the disclosure. In FIG. 2, a computer system 1 is, for example, a desktop computer, a notebook, an all-in-one personal computer (AIO PC) or a network computer. The computer system 1 includes one or more first hardware peripherals 10, a second hardware peripheral 12, a memory 14 and a BIOS chip 16. The BIOS chip 16 electrically connects to the first hardware peripheral 10, the second hardware peripheral 12 and the memory 14. The detailed description of components in the computer system 1 is shown below.

The one or more first hardware peripherals 10 and the second hardware peripheral 12 are disposed in the computer system 1, and each of the hardware peripherals provides a basic input output system (BIOS) boot specification table (BBS tables). The order of the BBS tables can indicate the order of the boot sequence of the hardware peripheral. The first hardware peripheral 10 is, for example, a SAS hard disk drive (HDD), a PCIE HDD, an universal serial bus (USB), or a SATA (serial advanced technology attachment) HDD which is directly connected to a computer main board or is electrically connected to a SAS HDD and a computer main board through an expansion card for external storages. The second hardware peripheral 12 is, for example, a network card (or called as a network interface card or a network interface controller) supporting a preboot execution environment (PXE), that is, the second hardware peripheral 12 can be a network card capable of being booted through a network. The preboot execution environment herein is based on a remote program load (RPL) technology in the network technology and is adapted to a host device which does not have its boot system or hard disk drives, so that the host device can be booted through remote servers and use data in the remote servers. Also, the preboot execution environment can perform the installation of operating systems and application programs through the remote servers.

The disclosure has no limitations on a quantity of hardware peripherals in the host device. In other words, the host device can include other hardware peripherals, for example, which can be interface cards (or called as adapters), such as HDD's, floppy disks, optical disk drives, display cards or network cards, or buses, such as universal serial buses or IEEE 1394 buses (or called as fire wires). Each hardware peripheral in the computer system 1 provides a BIOS boot specification table (BBS table). The order of these BBS tables indicates the order of these hardware peripherals being booted.

Figure 3:
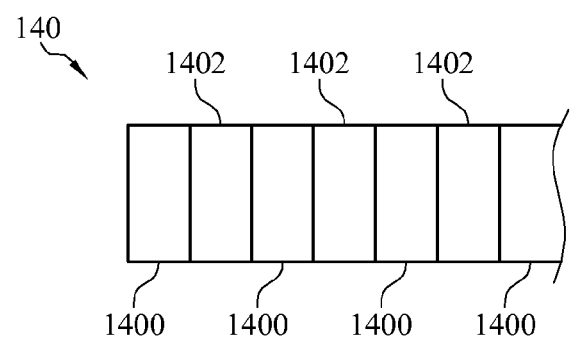
FIG. 3 is a schematic view of a first address space according to one embodiment.

The memory 14 can store information about the host device and include a first address space 140 for storing the BBS tables provided by hardware peripherals. In the first address space 140, there is a plurality of empty spaces 1400 preserved, as shown in FIG. 3. FIG. 3 is a schematic view of a first address space according to one embodiment. For example, the memory 14 is a non-volatile memory, such as a programmable read-only memory (PROM), an erasable programmable read-only memory (EPROM), an electrically erasable programmable read-only memory (EEPROM) or a flash memory, or a volatile memory, such as a dynamic random access memory (DRAM) or a static random access memory (SRAM). The empty spaces 1400 can be serial or not serial.

The BIOS chip 16 can execute a BIOS. When the computer system 1 is being booted to perform a power-on self-test (i.e. BIOS POST) of the BIOS, the BIOS chip 16 will establish an order of interrupt vectors for an interruption according to the order of the BBS tables provided by the hardware peripherals including the one or more first hardware peripherals 10 and the second hardware peripheral 12.

When the hardware peripherals are being initialized, there are the empty spaces 1400 preserved in the first address space 140 in the memory 14. Assume that a quantity of the one or more first hardware peripherals 10 is plural. If the initialized hardware peripherals are the first hardware peripherals 10, the BBS tables of the first hardware peripherals 10 are inserted into the empty spaces 1400 according to a specific order, so that the BIOS can obtain current interrupt vectors (i.e. new interrupt vectors) of the hardware peripherals to sort the BBS tables. If the initialized hardware peripherals are not the first hardware peripherals 10, the BBS tables of the hardware peripheral are sequentially inserted into an address space 1402, i.e. the first address space 140 expect the empty spaces 1400, and the BBS tables of the first hardware peripherals 10 are sorted according to a relative serial order.

In other words, the computer system 1 preserves an empty address space (i.e. one empty space 1400) before each of the address spaces 1402 storing the BBS tables of all of the hardware peripherals, and the BBS tables of all of the hardware peripherals in the first address spaces 142 are sorted. Whenever the computer system 1 initializes one first hardware peripheral 10, the computer system 1 inserts the content of the BBS table of the first hardware peripheral 10 into one empty space 1400. Thus, the entry address of the interruption (e.g. INT 13h) of the first hardware peripheral 10 will be use first, and then this first hardware peripheral 10 will be acquired or identified first under the preboot execution environment.

The BIOS uses the interruption according to the entry address of interruption in the BBS table and copies a master bootstrap record (MBR) of the first hardware peripheral 10 to the second address space (not shown in drawings) in the memory 14, to authorize a master bootstrap loader (MBL) in the master bootstrap record to search for an active partition. When the authorized master bootstrap loader searches out the active partition, the BIOS authorizes a secondary bootstrap loader in the active partition instead of the master bootstrap loader to activate the remote operating system. For example, the second address space includes address spaces of 0000h: 7C00h in the memory 14.

In the disclosure, there is no limitation on a quantity of the BBS tables of the hardware peripherals stored in the empty spaces 1400. In other words, the empty spaces 1400 can store the BBS table of at least one hardware peripheral. The interruption is, for example, INT 13 which is a disk basic input output interruption provided by the BIOS and can provide hard disk drives with reading services, writing services and formatting services in the art.

Figure 4:
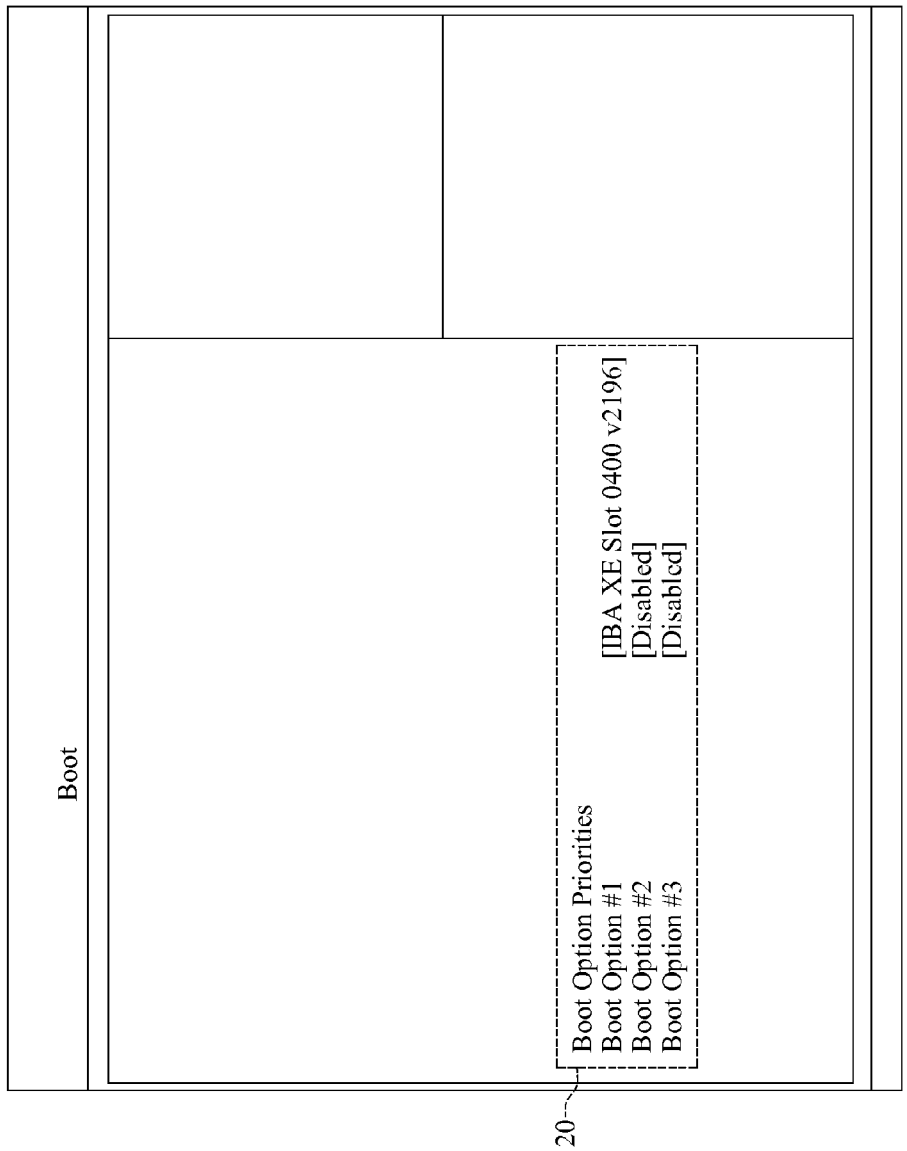
FIG. 4 is a schematic view of the setting in a boot menu of a host device according to one embodiment.

Subsequently, the BIOS disables the hardware peripherals except the second hardware peripheral 12. Therefore, there is only one boot option for the second hardware peripheral 12 remained in a setup interface of the BIOS, and the computer system 1 boots its operating system via only the second hardware peripheral 12, as shown in FIG. 4. FIG. 4 is a schematic view of the setting in a boot menu of a host device according to one embodiment. In FIG. 4, a boot menu 20 in the setup interface of the BIOS shows boot option priorities represented by a first boot option (Boot Option #1), a second boot option (Boot Option #2) and a third boot option (Boot Option #3). The second boot option and the third boot option are disabled, and only the first boot option is enabled. In other words, the BIOS disables the hardware peripherals except the second hardware peripheral 12 by setting the attributes of load options (EFI_LOAD_OPTION) of an extensible firmware interface which is provided by every hardware peripheral, to be 0, and the setting is recorded in firmware codes of the BIOS. Moreover, the text of "IBA XE Slot 0400 v2196" related to the first boot option is an example to represent the model of the second hardware peripheral 12 (i.e. the network card supporting the preboot execution environment), and the block 30 in the interface of the BIOS provides users with, for example, footnotes of function keys.

Then, the computer system 1 boots the preboot execution environment via the second hardware peripheral 12 and selectively installs a remote operating system into one of the first hardware peripherals 10 in the computer system 1. After the remote operating system is installed into this first hardware peripheral 10, the computer system 1 is rebooted. Accordingly, when the computer system 1 reboots the preboot execution environment via the second hardware peripheral, the computer system 1 boots its operating system under the preboot execution environment via the first hardware peripheral 10 which has been installed with the remote operating system. If the remote operating system is installed into the first hardware peripheral 10 not having the first priority, the boot of the preboot execution environment via the first hardware peripheral 10 not having the first priority is unsuccessful, and then the computer system 1 will continue to search for a next first hardware peripheral 10 in the sequence of the first hardware peripherals 10 until the first hardware peripheral 10 having the first priority is searched out. Then, the first hardware peripheral 10 which has the first priority and is installed with the remote operating system, will activate the preboot execution environment. Therefore, the computer system 1 does not need to be booted many times and edit the order of boot options, and when the second hardware peripheral 12 fails, other hardware peripherals will not be booted. In other words, the remote operating system will be installed into one first hardware peripheral 10 having the highest priority in the computer system 1 when the computer system 1 boots the preboot execution environment via the second hardware peripheral 12, and the computer system 1 is rebooted after the remote operating system is installed to reactivate the preboot execution environment via the second hardware peripheral 12. The computer system 1 then boots its operating system under the rebooted preboot execution environment via the first hardware peripheral 10 having the highest priority and being installed with the remote operating system.

In this way, when the computer system 1 is performing its operating system or installing application programs, only the network card (i.e. the second hardware peripheral 12) supporting the preboot execution environment will be booted and meanwhile all of the hardware peripheral (including the first hardware peripheral 10) corresponding to the empty spaces 1400 can be identified in the preboot execution environment, as shown in FIG. 5. FIG. 5 is a schematic view of an interface of a disk operating system of a host device according to one embodiment and shows the hardware peripherals, which the host device can sense, in the interface of the disk operating system. In other words, the computer system 1 under the disk operating system (DOS) of the preboot execution environment acquires information about all of the first hardware peripherals 10 in the computer system 1 and selects one of the first hardware peripherals 10 according to the acquired information to install the remote operating system. Generally, the first hardware peripheral 10 having the first priority will be selected to be installed with the remote operating system, and the computer system 1 will boots its operation system via the first hardware peripheral 10 having the first priority.

Moreover, the option read-only memory for the second hardware peripheral 12 to activate the preboot execution environment is in the BIOS or is in the firmware of the second hardware peripheral 12 (i.e. the network card firmware). The processing program that the BIOS establishes the order of interrupt vectors of the interruption according to the BBS tables of the hardware peripheral, is at a driver execution environment (DXE) stage of the power-on self-test of the BIOS performed by the computer system 1, and the processing program that the BIOS disables the hardware peripherals except the second hardware peripheral 12, is at a boot device selection (BDS) stage of the power-on self-test of the BIOS performed by the computer system 1. Because the boot procedure (including the power-on self-test of the BIOS) for the remote operating system is known in the art and thus, will not be described hereinafter.

Figure 6:
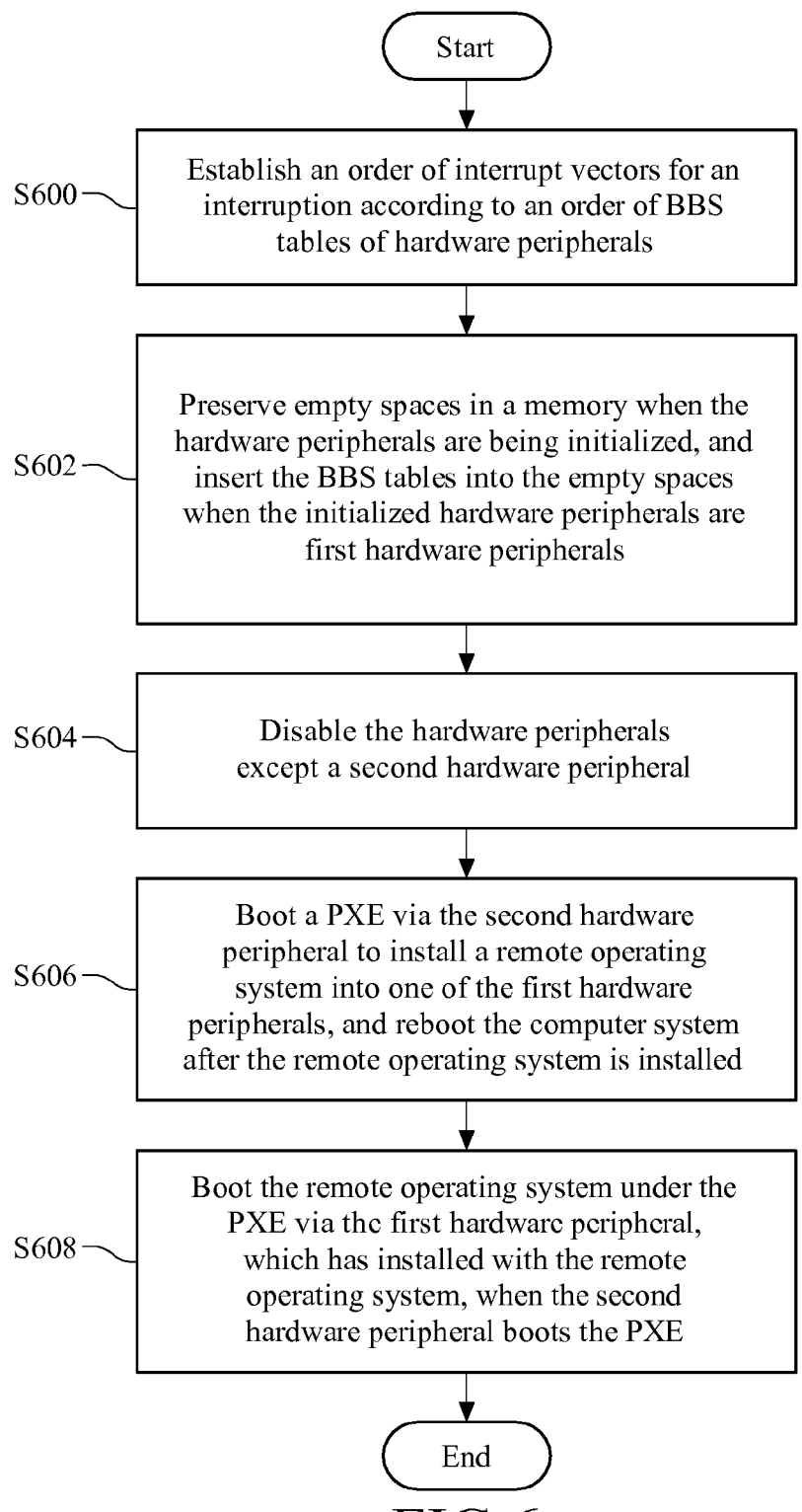
FIG. 6 is a flowchart of a boot method of a computer system according to one embodiment.

FIG. 6 is a flowchart of a boot method of a computer system according to one embodiment. The boot method is applied to a computer system which includes a plurality of hardware peripherals (including one or more first hardware peripherals and a second hardware peripheral). Each of the hardware peripherals provides a BBS table. Referring to FIG. 2 to FIG. 6, the detailed description of the boot method applied to the computer system 1 is illustrated below.

Firstly, in step S600, the computer system 1 establishes an order of interrupt vectors for an interruption according to an order of the BBS tables provided by the hardware peripherals. The aforementioned interruption is INT 13 which is a disk basic input output interruption provided by the BIOS. In step S602, when the hardware peripherals are being initialized, there is a plurality of empty spaces 1400 preserved in the first address space 140 in the memory 14 in the computer system 1, as shown in FIG. 3. Whenever one hardware peripheral is initialized and is the first hardware peripheral 10, the BBS table of this first hardware peripheral 10 will be inserted into one of the empty spaces 1400 which has a preset priority. Whenever one hardware peripheral is initialized and is not the first hardware peripheral 10, the BBS table of this hardware peripheral will be inserted into the address space 1402, i.e. the first address space except the empty spaces 1400. Therefore, the BBS tables of the first hardware peripherals 10 can be sorted in a relative serial order.

In step S604, the BIOS disables the hardware peripherals except the second hardware peripheral 12. Therefore, only the boot option of the second hardware peripheral 12 is remained in boot options of the setup interface of the BIOS, and the computer system 1 boots via only the second hardware peripheral 12, as shown in FIG. 4. In step S606, the computer system 1 boots the preboot execution environment via the second hardware peripheral 12 and selects the first hardware peripheral 10 to install a remote operating system into the selected first hardware peripheral 10, and the computer system 1 is booted after the remote operating system is installed. In an alternative exemplary embodiment, if the quantity of first hardware peripherals 10 in the computer system 1 is plural, the remote operating system can be installed into one of the first hardware peripherals 10.

In step S608, when the computer system 1 reboots the preboot execution environment via the second hardware peripheral 12, the computer system 1 under the preboot execution environment boots its operating system via the first hardware peripheral 10 which is installed with the remote operating system. Assume the computer system 1 includes a plurality of hard disk drives. If the remote operating system is installed into the HDD not related to the first boot option, the boot of the HDD not related to the first boot option will fail in the preboot execution environment. If the remote operating system is installed into the HDD related to the first boot option, the HDD related to the first boot option will activate the remote operating system. In one embodiment, the BIOS invokes an interruption according to an entry address for the interruption in the BBS table and copies a master bootstrap record of the first hardware peripheral 10 to the second address space 1402 in the memory 14, so that a master bootstrap loader in the master bootstrap record is authorized to search for an active partition. When the master bootstrap loader searches out the active partition, a secondary bootstrap loader in the active partition will be authorized master bootstrap loader instead of the master bootstrap loader to activate the remote operating system. For example, the second address space 1402 includes address spaces of 0000h:7C00h in the memory 14.

In one embodiment, the computer system 1 acquires information about all first hardware peripherals 10 under a disk operating system of the preboot execution environment and selects one first hardware peripheral 10 according to the acquired information to install the remote operating system into the selected first hardware peripheral 10. In one embodiment, the step S604, where the BIOS disables the hardware peripherals except the second hardware peripheral 12, is performed by setting attributes of load options (EFI_LOAD_OPTION) of an extensible firmware interface provided by every hardware peripheral to be 0, and the setting is recorded in firmware codes of the BIOS.

In one embodiment, the first hardware peripheral 10 is a HDD, and the second hardware peripheral 12 is a network card supporting the preboot execution environment. In one embodiment, an option read-only memory for the second hardware peripheral 12 to execute the preboot execution environment is in the BIOS or in network card firmware. In one embodiment, when the computer system 1 boots the preboot execution environment via the second hardware peripheral 12, the remote operating system is installed into the first hardware peripheral 10 having the highest priority, and then the computer system 1 is rebooted. When the computer system 1 reboots the preboot execution environment via the second hardware peripheral 12, the first hardware peripheral 10, which has the highest priority and is installed with the remote operating system, boots the remote operating system under the preboot execution environment.

Moreover, in one embodiment, the step S600, where the BIOS establishes the order of interrupt vectors of the interruption according to the order of the BBS tables of the hardware peripherals, is at a DXE stage of the power-on self-test for the BIOS performed by the computer system 1, and the step S604, where the BIOS disables the hardware peripherals except the second hardware peripheral 12, is at a BDS stage of the power-on self-test for the BIOS performed by the computer system 1.

In view of the above embodiments, the computer system and the boot method thereof in the disclosure preserve a plurality of empty spaces in the first address space, and whenever the hardware peripheral having the highest priority is initialized, insert the BBS table of this hardware peripheral into the first empty space. Herein, the entry address of the interruption instruction of this hardware peripheral will be invoked so that this hardware peripheral will be first identified in the preboot execution environment. Moreover, in the disclosure, since the hardware peripherals except the hardware peripheral which supports the preboot execution environment are disabled in the boot menu, when the host device installs the remote operating system, only the hardware peripheral supporting the preboot execution environment will be booted. Meanwhile, other hardware peripherals can be identified and booted in the preboot execution environment according to their priority. In this way, when the remote operating system is being installed, the computer system will not be rebooted many times and the order of boot options will be edited. Moreover, when the preboot execution environment is booted unsuccessfully, other hardware peripherals will not be booted and only the hardware peripheral supporting the preboot execution environment will be rebooted repeatedly. Also, information about all of the hardware peripherals in the host device may be acquired much easily.

What is claimed is:

1. A boot method for a computer system which comprises a plurality of hardware peripherals each of which provides a basic input output system (BIOS) boot specification (BBS) table, comprising:
    establishing an order of interrupt vectors for an interruption according to an order of the BBS tables of the hardware peripherals by the computer system when the computer system performs a power-on self-test of a BIOS;
    preserving a plurality of empty spaces in a first address space of a memory in the computer system when the hardware peripherals are being initialized, wherein the empty spaces are serial or not serial;
    inserting the BBS tables into the empty spaces according to a specific order when the initialized hardware peripherals are a plurality of first hardware peripherals, and inserting the BBS tables into the first address space except the empty spaces sequentially when the initialized hardware peripherals are not the first hardware peripherals, to sort the BBS tables according to a relative serial order;
    enabling a second hardware peripheral of the hardware peripherals and disabling the other hardware peripherals in a setup interface of the BIOS by the BIOS;
    booting a preboot execution environment via the second hardware peripheral to selectively install a remote operating system into one of the first hardware peripherals;
    rebooting the computer system after the remote operating system is installed in to the one of the first hardware peripherals; and
    booting the remote operating system under the preboot execution environment via the first hardware peripheral, which has installed with the remote operating system, when the second hardware peripheral boots the preboot execution environment.

2. The boot method according to claim 1, further comprising:
    invoking the interruption according to an entry address for the interruption in the BBS table by the BIOS, and copying a master bootstrap record of the first hardware peripheral to a second address space of the memory, to authorize a master bootstrap loader in the master bootstrap record to search for an active partition; and
    authoring a secondary bootstrap loader in the active partition instead of the master bootstrap loader to activate the remote operating system when the master bootstrap loader searches out the active partition.

3. The boot method according to claim 1, wherein the computer system boots the preboot execution environment via the second hardware peripheral; the remote operating system is installed to the first hardware peripheral having the highest priority in the computer system; the computer system is rebooted after the remote operating system is installed to the first hardware peripheral having the highest priority in the computer system; and when the computer system reboots the preboot execution environment via the second hardware peripheral, the first hardware peripheral having the highest priority and installed with the remote operating system boots the remote operating system under the rebooted preboot execution environment.

4. The boot method according to claim 1, wherein the computer system acquires information about all of the first hardware peripherals in the computer system and selects one of the first hardware peripherals according to the acquired information to install the remote operating system in the selected first hardware peripheral under a disk operating system of the preboot execution environment.

5. The boot method according to claim 1, wherein the BIOS disables the hardware peripherals except the second hardware peripheral by setting attributes of load options of an extensible firmware interface provided by each of the hardware peripherals to be 0, and the setting of the attributes are embedded at firmware codes of the BIOS.

6. The boot method according to claim 1, wherein the first hardware peripheral is a hard disk drive, and the second hardware peripheral is a network card supporting the preboot execution environment.

7. The boot method according to claim 1, wherein an option read-only memory for the second hardware peripheral to activate the preboot execution environment is in the BIOS or in network card firmware of the second hardware peripheral.

8. The boot method according to claim 1, wherein the interruption is a disk basic input output interruption provided by the BIOS.

9. The boot method according to claim 1, wherein the step that the BIOS establishes the order of interrupt vectors corresponding to the interruption according to the BBS table of the hardware peripherals, is in a DXE stage that the computer system performs the power-on self-test on the BIOS, and the step that the BIOS disables the hardware peripherals except the second hardware peripheral, is in a BDS stage that the computer system performs the power-on self-test on the BIOS.

10. A computer system, comprising:
    a plurality of hardware peripherals disposed in the computer system and comprising a first hardware peripheral and a second hardware peripheral, and each of the hardware peripherals being configured to provide a BBS table;
    a memory comprising a first address space for storing the BBS tables, wherein the first address space comprises a plurality of empty spaces; and
    a BIOS;
    wherein when the computer system is powered on, the BIOS performs a power-on self-test and establishes an order of interrupt vectors for an interruption according to an order of the BBS tables of the hardware peripherals;
    when the hardware peripherals is being initialized, there is a plurality of empty spaces preserved in the first address space in the memory, and the empty spaces are serial or not serial;
    if the initialized hardware peripherals are the first hardware peripherals, the BBS tables of the first hardware peripherals are inserted into the empty spaces according to a specific order to reestablish new interrupt vectors of the hardware peripherals for the BIOS to sort the order of the BBS tables, and if the initialized hardware peripherals are not the first hardware peripherals, the BBS tables of the hardware peripherals are sequentially inserted into the first address space except the empty spaces to sort the BBS tables of the first hardware peripherals according to a relative serial order;
    the BIOS enables a second hardware peripheral of the hardware peripherals and disables the other hardware peripherals in an setup interface of the BIOS, and after the computer system boots the preboot execution environment via the second hardware peripheral to selectively install a remote operating system into one of the first hardware peripherals in the computer system, the computer system is rebooted; and when the rebooted computer system reboots the preboot execution environment via the second hardware peripheral, the rebooted computer system under the preboot execution environment selectively boots the remote operating system via the first hardware peripheral which is installed with the remote operating system, and when the rebooted computer system reboots the preboot execution environment via the second hardware peripheral unsuccessfully, the second hardware peripheral continues rebooting the preboot execution environment to boot the remote operating system until the remote operating system is booted successfully.

11. The computer system according to claim 10, wherein the BIOS invokes the interruption according to an entry address of the interruption in the BBS table, and copies a master bootstrap record of the first hardware peripheral to a second address space of the memory, to authorize a master bootstrap loader in the master bootstrap record to search for an active partition; and when the master bootstrap loader searches out the active partition, the BIOS authorizes a secondary bootstrap loader in the active partition instead of the master bootstrap loader to activate the remote operating system.

12. The computer system according to claim 10, wherein the computer system boots the preboot execution environment via the second hardware peripheral; the remote operating system is installed to the first hardware peripheral having the highest priority in the computer system; the computer system is rebooted after the remote operating system is installed to the first hardware peripheral having the highest priority in the computer system; and when the computer system reboots the preboot execution environment via the second hardware peripheral, the first hardware peripheral having the highest priority and installed with the remote operating system boots the remote operating system under the rebooted preboot execution environment.

13. The computer system according to claim 10, wherein the computer system acquires information about all of the first hardware peripherals in the computer system and selects the one of the first hardware peripherals to install the remote operating system in the selected first hardware peripheral according to the acquired information under a disk operating system of the preboot execution environment.

14. The computer system according to claim 10, wherein the BIOS disables the hardware peripherals except the second hardware peripheral by setting attributes of load options of an extensible firmware interface provided by each of the hardware peripherals to be 0, and the setting of the attributes are performed at firmware codes of the BIOS.

15. The computer system according to claim 10, wherein the first hardware peripheral is a hard disk drive, and the second hardware peripheral is a network card supporting the preboot execution environment.

16. The computer system according to claim 10, wherein an option read-only memory for the second hardware peripheral to activate the preboot execution environment is in the BIOS or in network card firmware of the second hardware peripheral.

17. The computer system according to claim 10, wherein the interruption is a disk basic input output interruption provided by the BIOS.

18. The computer system according to claim 10, wherein a processing program that the BIOS establishes the order of interrupt vectors corresponding to the interruption according to the BBS table of the hardware peripherals, is in a DXE stage that the computer system performs the power-on self-test on the BIOS, and a processing program that the BIOS disables the hardware peripherals except the second hardware peripheral, is in a BDS stage that the computer system performs the power-on self-test on the BIOS.

* * * * *